United States Patent [19]
Grundvig

[11] Patent Number: 5,844,435
[45] Date of Patent: Dec. 1, 1998

[54] LOW POWER, HIGH ACCURACY CLOCK CIRCUIT AND METHOD FOR INTEGRATED CIRCUITS

[75] Inventor: Jeffrey Paul Grundvig, Macungie, Pa.

[73] Assignee: Lucent Technologies Inc, Murray Hill, N.J.

[21] Appl. No.: 816,014

[22] Filed: Mar. 11, 1997

[51] Int. Cl.⁶ ...................................................... H03L 7/06
[52] U.S. Cl. ........................... 327/151; 327/99; 327/160; 327/292; 375/369; 331/55; 395/556
[58] Field of Search ..................................... 327/144–153, 327/160, 99, 292; 331/46, 55, 49; 375/369; 395/556

[56] References Cited

U.S. PATENT DOCUMENTS

| | | | |
|---|---|---|---|
| 4,344,046 | 8/1982 | Zumsteg | 331/46 |
| 5,126,695 | 6/1992 | Abe | 331/46 |
| 5,416,435 | 5/1995 | Jokinen et al. | 327/151 |
| 5,430,393 | 7/1995 | Shankar et al. | 327/142 |
| 5,475,324 | 12/1995 | Tomiyori | 331/49 |

OTHER PUBLICATIONS

A Microprocessor–Based Analog Wristwatch Chip with 3 Seconds/Year Accuracy, Didier Lanfranchi, Evert Dijkstra, Daniel Aebischer, Feb. 16, 1994.

Primary Examiner—Kenneth B. Wells

[57] ABSTRACT

A clock circuit for providing an integrated circuit with a high accuracy, crystal oscillator clock which interfaces to an "off-chip" crystal to provide a high accuracy clock signal while an internal, low power oscillator provides a low power clock source. Either clock may be selected to drive a programmable processor under program control. When high accuracy and stability are required, the crystal oscillator may be chosen as the processor clock, and when lower power is desired, the low power oscillator may be chosen as the processor clock while the high accuracy clock is disabled. The high accuracy oscillator is used to clock a first timer circuit, while the low power oscillator is used to clock a second timer circuit. The second timer circuit output, in turn, is synchronized to the processor clock so that the programmable processor can utilize the second timer circuit even when the processor clock is asynchronous to the second timer circuit. When the high accuracy oscillator has been selected as the timing source to the programmable processor and to the first timer circuit, and the low power oscillator is clocking the second timer circuit, the programmable processor under program control can effectively measure the frequency of the "on-chip" low power oscillator in terms of the frequency of the high accuracy clock. Accordingly, when the high accuracy clock is disabled, the programmable processor can use the low power oscillator more accurately.

22 Claims, 2 Drawing Sheets

LOW POWER, HIGH ACCURACY CLOCK CIRCUIT AND METHOD FOR INTEGRATED CIRCUITS

FIELD OF THE INVENTION

The present invention relates generally to the field of low power integrated circuits and more particularly to the field of low power, hybrid clock circuits for integrated circuits.

BACKGROUND OF THE INVENTION

As is generally known in the art, Integrated Circuits (ICs) of ten utilize a crystal oscillator clock circuit to provide an accurate clock for a given system. Crystal oscillator clock circuits utilize "off-chip" components (i.e. external to the IC) to provide more accurate clocking to the system. Such "off-chip" components, however, invariably increase the power requirements of the chip itself, and thus are less desirable for certain applications. As a result, for many power sensitive applications, other types of clock circuits, such as low power, integrated or "on-chip" oscillator designs, are utilized.

These low power "on-chip" oscillator designs, however, lack the accuracy that is provided by the higher power-consuming off-chip components. For example, device-to-device variations in "on-chip" oscillator frequencies vary significantly due to processing variations inherent in the manufacture of ICs. As a result, such low-power, on-chip oscillator designs are not desirable for most communications equipment.

Heretofore, there have been some attempts to create low-power, high accuracy clock circuits. Such attempts include the integrated circuit described in U.S. Pat. No. 5,430,393, issued to Shankar, et. al. on Jul. 4, 1995, and entitled, "Integrated Circuit with a Low-Power Mode and Clock Amplifier Circuit for Same." The integrated circuit disclosed in this U.S. Patent has a low-power mode in which at least one switched inverter stage of a clock amplifier is disabled in response to a stop signal. The stop signal indicates that the integrated circuit is in a low-power mode. In one embodiment, each switched inverter stage is a complementary metal-oxide-semiconductor (CMOS) switched inverter, in which an additional P-channel transistor is connected between the source of an inverter P-channel transistor and a positive power supply voltage terminal, and in which an additional N-channel transistor is connected between a source of an inverter N-channel transistor and a negative power supply voltage terminal. A non-switched inverter stage remains active during low-power mode to maintain a DC value of a clock input signal near a switch point of the clock amplifier. However, other than maintaining this DC value of the clock input signal, this circuit has no other means of determining elapsed time. Furthermore, the stop signal only refers to the oscillator itself and not to the system clock.

Other attempts to lower the power required by IC clock circuits include U.S. Pat. No. 5,126,695 issued to Abe et al. on Jun. 30, 1992, and entitled, "Semiconductor Integrated Circuit Device Operated with an Applied Voltage Lower than Required by its Clock Oscillator." This U.S. Patent discloses a semiconductor integrated circuit device that includes a first oscillator circuit, which is driven by a first voltage, for generating a first clock signal employed as the internal system clock signal for an internal circuit. A second oscillator circuit is driven by a second voltage lower than the first voltage for generating a second clock signal. A voltage boost circuit generates a stepped up voltage based on the second clock signal, where the stepped up voltage is higher than the first voltage and is supplied to the first oscillator circuit and the internal circuit as their circuit source voltage. In another embodiment, an oscillation detecting circuit detects whether or not the first oscillator circuit is in an oscillating or non-oscillating state and, then, generates a clock selection control signal of a first type when the first oscillator circuit is in a non-oscillating state, and generates a clock selection control signal of a second type when the first oscillator circuit is in an oscillating state. A clock signal selecting circuit is connected to receive either the first type or the second type clock selection control signal for respectively selecting either the second or the first clock signal for output. The oscillation detecting circuit is adapted to cease the oscillation of the second oscillator circuit when the first oscillator circuit is in its oscillating state. This device, however, requires a rather elaborate system of two power supplies and selection circuits to accomplish its goals.

Accordingly, there still exists a need in the art for a low power, high accuracy clock circuit and method for providing an oscillator clock signal to an integrated circuit. There is also a need to provide such a design without adding expensive or unduly burdensome circuitry to the overall integrated circuit and to provide such a circuit architecture that may be readily manufactured with current fabrication techniques.

SUMMARY OF THE INVENTION

These and other aspects of the invention may be obtained generally in a high accuracy, low power clock circuit for an integrated circuit which includes a high accuracy, crystal oscillator which interfaces to an "off-chip" crystal to provide the high accuracy clock, while an internal, low power oscillator provides a low power clock source. Either clock may be selected to drive the processor under program control. When high accuracy and stability are required, the crystal oscillator may be chosen as the processor clock, and when lower power is desired, the low power oscillator may be chosen as the processor clock while the high accuracy clock is disabled.

The high accuracy oscillator is used to clock a first timer circuit (hereinafter timer A circuit) and the low power oscillator is used to clock a second timer circuit (hereinafter timer B circuit). The timer B circuit output, in turn, is synchronized to the processor clock so that the processor can utilize the timer B circuit even when the processor clock is asynchronous to the timer B circuit. When the high accuracy oscillator has been selected as the timing source to the processor and to the timer A circuit, and the low power oscillator is clocking the timer B circuit, the processor under program control can effectively measure the frequency of the "on-chip" low power oscillator in terms of the frequency of the high accuracy clock. Once the frequency of the "on-chip" low power oscillator has been determined, the processor under program control can correct for any timing problems, and thus allow for the system to operate at a higher degree of accuracy even when the low power clock has been selected as the processor clock and the high accuracy clock is disabled to conserve power. Thus, rather than trying to control the absolute frequency of an "on-chip" low power oscillator, the dual clock architecture of the present invention instead allows for frequency variations to be easily measured and accounted for using program control of the processor.

The present invention also allows for power conservation by turning off the clock to as much logic as possible and providing a more practical and effective way for turning the clock back on. Through program control, the processor efficiently turns itself off and on via a "stopset" control signal. The processor configures the timer B circuit to count out a desired interval and then turns off the high accuracy oscillator via a "disable" control signal, and in turn, stops the high accuracy processor clock via a "stopclock" control signal. Because the timer B circuit runs using the low power oscillator as its clock source, it will continue to operate in a low power mode even while all other circuitry is completely shut down. When the timer B circuit counts out the previously specified interval, the high accuracy oscillator will be turned back on as the processor clock source via a "stopclear" control signal and the processor can proceed.

The present invention therefore overcomes the shortcomings of the prior art devices and methods described above.

BRIEF DESCRIPTION OF THE DRAWING

These and other features of the invention will be better understood in light of the Detailed Description of the Invention and the attached Figures wherein.

DETAILED DESCRIPTION OF THE INVENTION

Figure 1:
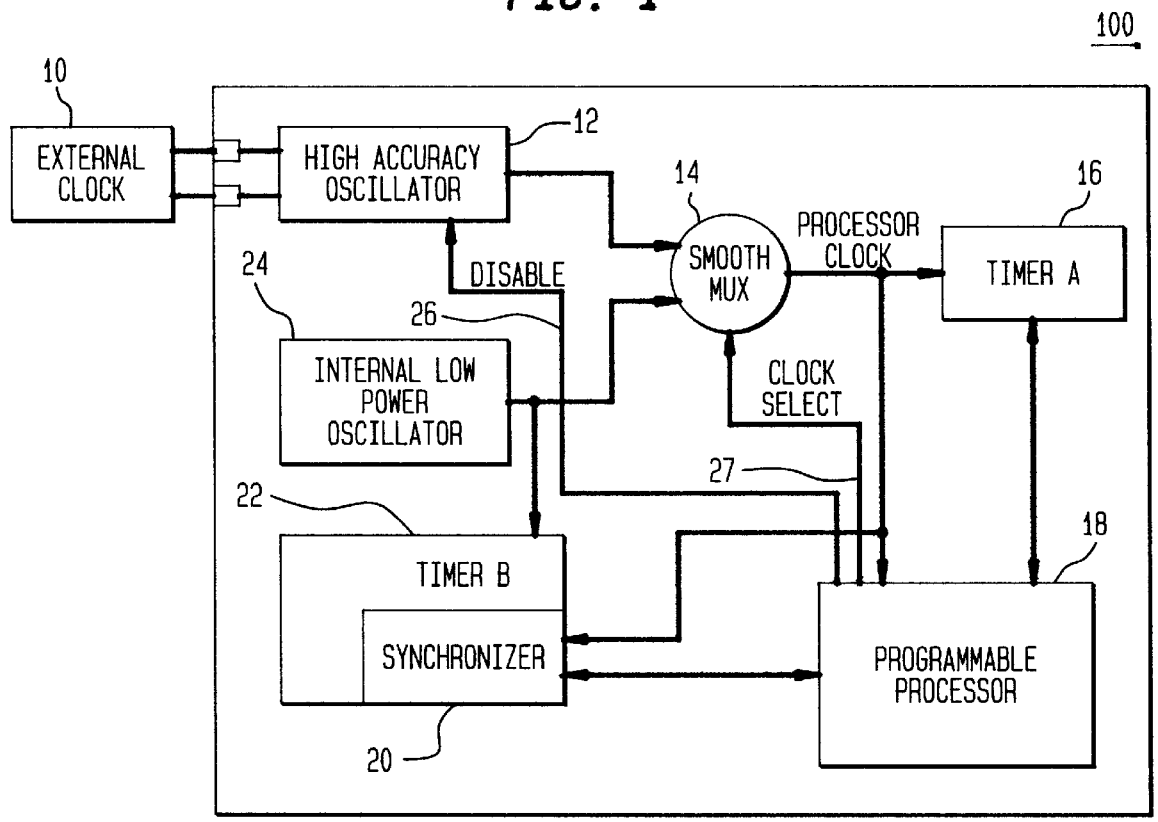
FIG. 1 is a block schematic of one embodiment of the present invention.

Now referring to FIG. 1, there is shown a block schematic of one embodiment of the present invention. As shown, an external clock 10, such as a high accuracy crystal clock source, is connected via conventional inputs and outputs to a high accuracy, oscillator 12 on Integrated Circuit (IC) 100. The interface to the "off-chip" crystal (external clock) 10 provides the necessary high accuracy frequency stability for the high accuracy oscillator 12 to act as a clock for the IC 100. A low power oscillator 24 on IC 100 provides an additional "on-chip" low power clock source for the IC 100. According to the present invention, either the high accuracy oscillator 12 in combination with the "off-chip" crystal (or external clock) 10 or the low power oscillator 24 may be selected as a processor clock source to drive a programmable processor 18 under program control. As will be explained, in a first mode when high accuracy and stability are required, the high accuracy oscillator 12 and external clock 10 may be advantageously chosen as the processor clock source. In a second mode when lower power is desired, the low power oscillator 24 may be chosen as the processor clock source while the high accuracy oscillator 12 is disabled.

Both the high accuracy oscillator 12 and the low power oscillator 24 are coupled to a multiplexer, such as a smooth multiplexer (smooth mux) 14, which switches between the two clock inputs. As will be understood by those skilled in the art, smooth multiplexers are a type of multiplexer having additional control logic that ensures glitch-free output by switching between the inputs at a time when neither input is changing. By way of example, operation of smooth mux 14 in the present invention can be as follows. When a multiplexer select signal of smooth mux 14 has been changed, control logic will first wait for a falling edge of a clock cycle from low power oscillator 24. Once this condition is detected, the smooth mux 14 will wait to switch between inputs until immediately following the next falling edge of a clock cycle from the high accuracy oscillator 12.

The smooth mux 14 outputs to both a first timer circuit (timer A circuit) 16, which counts the output cycles of the high accuracy oscillator 12, and to the programmable processor 18. The output to the programmable processor 18 is also input to a synchronizer 20 of a second timer circuit (timer B circuit) 22. The timer B circuit 22 counts the output cycles of the low power oscillator 24 in order to monitor the frequency of or determine a timing relationship between the timer B circuit 22 and the high accuracy oscillator 12 so as to provide a consistent timing mechanism.

Even though the low power oscillator 24 is sometimes used as the processor clock source for low accuracy timing applications, the low power oscillator 24 is also used to clock the timer B circuit 22. The timer B circuit 22 is also output via synchronizer 20 to the programmable processor 18 so that the programmable processor 18 can utilize the timer B circuit 22 even when the processor clock source is asynchronous to the timer B circuit 22, that is, when the high accuracy oscillator 12 is being used as the processor clock source. The processor clock is also used to clock the timer A circuit 16, as is shown in FIG. 1, by the two way connection line between the two elements.

In operation and to conserve power, when the high accuracy oscillator 12 is not needed, the programmable processor 18 outputs a disable signal 26 to the high accuracy oscillator 12. However, when the high accuracy oscillator clock (high accuracy oscillator 12 in combination with the external clock 10) is required as the timing source to the programmable processor 18 (including the timing source to the timer A circuit), the programmable processor 18 sends "clockselect" signal 27 to the multiplexer 14, and the high accuracy oscillator is selected and sent through the smooth mux 14 to the programmable processor 18 to act as the processor clock source. Even though the high accuracy oscillator 12 may be in operation, the low power oscillator 24 continues to clock the timer B circuit 22, so that the programmable processor 18 under program control may effectively measure the frequency of the low power oscillator 24 in relation to the frequency of the high accuracy clock (high accuracy oscillator 12 in combination with the external clock 10). The programmable processor 18 accomplishes this by monitoring the clock cycles of the timer A circuit 16 and timer B circuit 22 to identify a timing relationship between the output cycles of the low power oscillator 24 and high accuracy oscillator 12.

Thus, once the frequency of the low power oscillator 24 has been determined, the programmable processor 18 uses the timing relationship to account for any differences in clock cycles between the high accuracy oscillator 12 and low power oscillator 24. Specifically, using this timing relationship allows the system to operate at a higher degree of accuracy even when the low power oscillator 24 has subsequently been selected as the timing source of the processor clock and the high accuracy oscillator 12 is disabled via disable signal 26 in order to conserve power.

In contrast to prior art approaches, the programmable processor 18 uses the timing relationship to make adjustments in counting the time interval for switching back to the high accuracy oscillator 12. This approach may reduce or eliminate the need for synchronization. By way of example, the timing relationship can be used in the present invention as follows. The programmable processor 18 can set the timer A circuit 16 to count out a predetermined interval X which is a fraction of a desired sleep time Z, where Z=X * Y. While timer A circuit 16 is counting out interval X, the timer B circuit 22 is enabled to count indefinitely. Upon completion of timer A circuit 16 counting out interval X, the timer B circuit 22 is checked to determine how many corresponding cycles, represented as LPC, were counted in the timer B circuit 22 from the low power oscillator 24 during the interval X. When programmable processor 18 is placed in a sleep mode, the timer B circuit 22 would be programmed to count out the sleep time Z. Specifically, the timer B circuit 22 would be programmed to count out LPC*Y cycles of the low power oscillator 24 prior to waking up the programmable processor 18.

Figure 2:
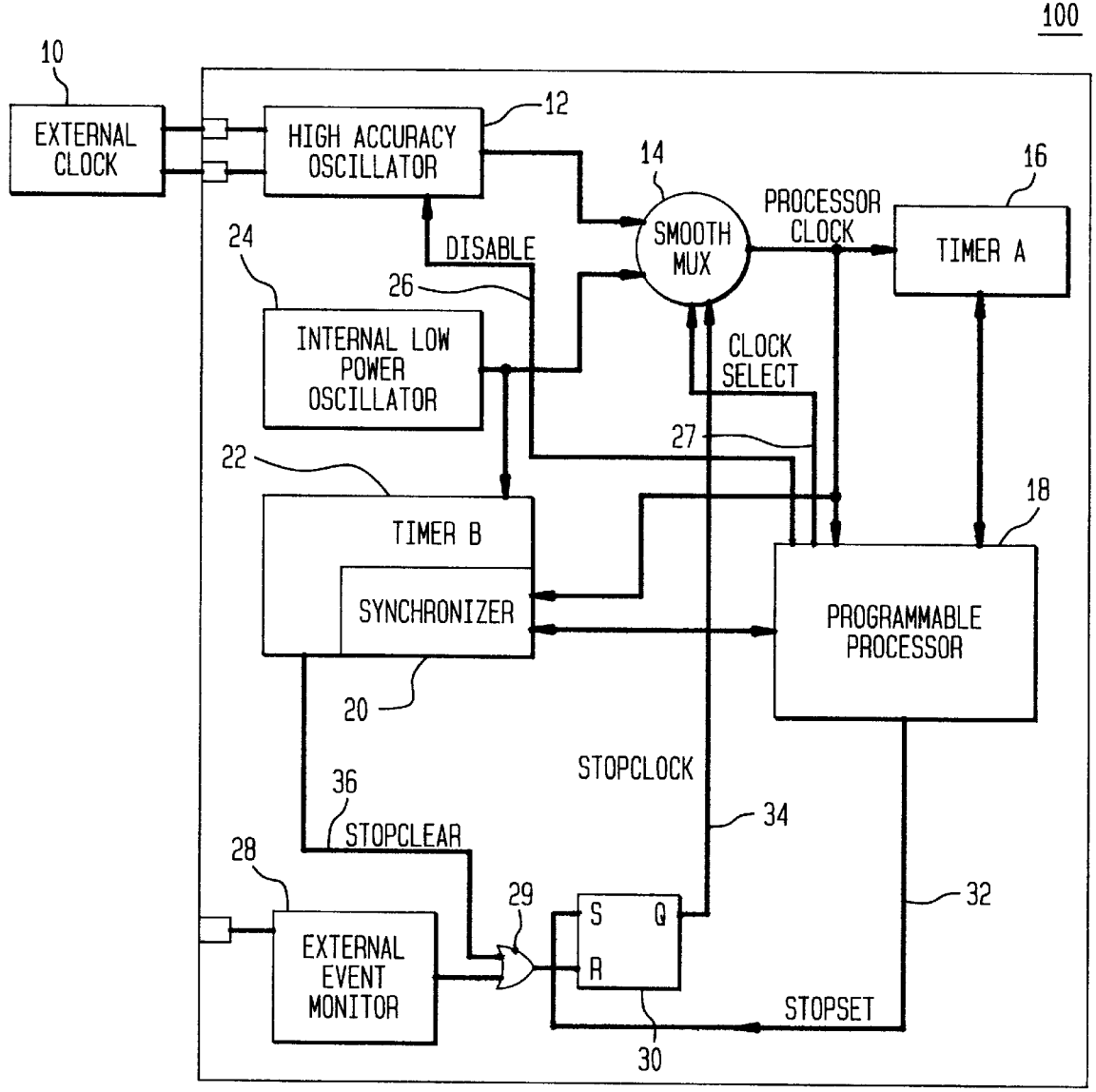
FIG. 2 is a block schematic of another embodiment of the present invention.

Now referring to FIG. 2, there is shown a second embodiment of the present invention wherein power is saved by turning off the clock to as much logic as possible, or in other words providing for a "stopclock" ability. However, in order for a "stopclock" mode to be more practical, an effective way to turn the clock back on is needed. Accordingly, a second embodiment of the present invention uses the same low power oscillator 24 in conjunction with the timer B circuit 22 to allow the programmable processor 18 to efficiently turn off the clock to as much logic as possible via a "stopclock" control signal 34. In particular, the programmable processor 18 can first configure the timer B circuit 22 to count out a desired interval. The high accuracy oscillator 12 is turned off via a "disable" control signal 26 from programmable processor 18, which then stops functioning via a "stopset" control signal 32. Since the timer B circuit 22 runs using the low power oscillator 24 as its clock source, it will continue to operate in a low power mode even while all other circuitry is completely shut down. When the timer B circuit 22 counts out the previously specified interval, the system clock will be turned back on via a "stopclear" control signal 36 and the programmable processor 18 can proceed.

An example application of the present invention is a cordless phone hand set, which as would be understood, will benefit from a longer battery life. As is well known, for most of the time, these handsets simply wait for an incoming or outgoing call. This wait time consists simply of periodically polling the base station to determine if an incoming signal is present. During a polling operation, the programmable processor 18 of the present invention would use the high accuracy oscillator 12 (including the external clock 10) as the system clock and, in addition to other normal operations, the programmable processor 18 would use the timer A and B circuits 16 and 22 respectively to measure the current frequency of the low power oscillator 24. When finished with polling the base station, the programmable processor 18 would set the timer B circuit 22 to count out a down time preceding the next polling period. Then, the programmable processor 18 would switch the processor clock to the low power oscillator 24 and disable the high accuracy oscillator 12 and the processor clock as previously described. During this disabled period, an external event sensor 28 will turn the clock back on if a user event occurs, for example, if a keypad button is depressed. If such an external event does not occur, then the timer B circuit 22 turns on the clock once the previously determined interval has elapsed.

As shown in FIG. 2, the output of the external event monitor 28 and the "stopclear" signal 36 from the timer B circuit 22 are combined in an OR logic gate 29. An output from OR logic gate 29 is provided to controller 30, which can be a set-reset (SR) latch. Accordingly, either an external event (e.g., keypad button being depressed) or the expiration of the previously determined interval will place the controller in a high state and cause the processor clock to turn back on. The Stopset control signal 32 is output from the programmable processor 18 to controller 30, which, in turn, outputs the "stopclock" control signal 34 to the smooth mux 14. Consequently, controller 30 is used to provide the appropriate signal to smooth mux 14 to turn the processor clock on and off depending on the given conditions.

Although the present invention has been described using only two embodiments, those skilled in the art may devise other methods and configurations utilizing the present invention. Accordingly, the present invention should not be limited by the foregoing disclosure, but only by the following claims.

What is claimed is:

1. A low power, high accuracy clock circuit for integrated circuits comprising:

first and second oscillators, said first oscillator being a low power oscillator relative to said second oscillator and said second oscillator being a high accuracy oscillator relative to said first oscillator;

said second oscillator coupled to an external, high accuracy clock source;

a first timer circuit operable to count clock cycles of said high accuracy oscillator and a second timer circuit operable to count clock cycles of said low power oscillator; and a programmable processor coupled to said low power oscillator and said high accuracy oscillator, said programmable processor operable to select said high accuracy oscillator as a processor clock source in a first mode and said low power oscillator as said processor clock source in a second mode, wherein said programmable processor monitors said clock cycles counted by said first and second timer circuits to identify a timing relationship between said high accuracy oscillator and said low power oscillator.

2. The clock circuit of claim 1 wherein said programmable processor is operable to disable said high accuracy oscillator during a predetermined condition, and wherein said programmable processor uses said timing relationship to adjust for timing differences between said low power oscillator and said high accuracy oscillator when said high accuracy oscillator is disabled and said low power oscillator is operable as said processor clock source.

3. The clock circuit of claim 1 wherein said external, high accuracy clock source is a crystal-based clock.

4. The clock circuit of claim 1 farther comprising a multiplexer wherein said low power oscillator and said high accuracy oscillator are multiplexed to said programmable processor.

5. The clock circuit of claim 4 wherein said multiplexer is a smooth multiplexer having control logic for switching between inputs from said low power oscillator and said high accuracy oscillator in a glitch-free manner.

6. An integrated circuit for providing low power, high accuracy clocking, comprising:

first and second oscillators, said first oscillator being a low power oscillator relative to said second oscillator and said second oscillator being a high accuracy oscillator relative to said first oscillator;

said second oscillator coupled to an external, high accuracy clock source;

a first timer circuit operable to count clock cycles of said high accuracy oscillator and a second timer circuit operable to count clock cycles of said low power oscillator; and a programmable processor coupled to said low power oscillator and said high accuracy oscillator, said programmable processor operable to select said high accuracy oscillator as a processor clock source in a first mode and said low power oscillator as said processor clock source in a second mode, wherein said programmable processor monitors said clock cycles counted by said first and second timer circuits to identify a timing relationship between said high accuracy oscillator and said low power oscillator.

7. The integrated circuit of claim 6 wherein said programmable processor is operable to disable said high accuracy oscillator during a predetermined condition, and wherein said programmable processor uses said timing relationship to adjust for timing differences between said low power oscillator and said high accuracy oscillator when said high accuracy oscillator is disabled and said low power oscillator is operable as said processor clock source.

8. The integrated circuit of claim 6 further comprising said external, high accuracy clock source, and wherein said external, high accuracy clock source is a crystal-based clock.

9. The integrated circuit of claim 6 further comprising a multiplexer wherein said low power oscillator and said high accuracy oscillator are multiplexed to said programmable processor.

10. The integrated circuit of claim 9 wherein said multiplexer is a smooth multiplexer having control logic for switching between inputs from said low power oscillator and said high accuracy oscillator in a glitch-free manner.

11. The integrated circuit of claim 9, wherein said second timer circuit provides a stopclear signal via a logic circuit to said multiplexer to enable said high accuracy oscillator as said processor clock source at predetermined intervals.

12. An integrated circuit for providing low power, high accuracy clocking, comprising:

first and second oscillators, said first oscillator being a low power oscillator relative to said second oscillator and said second oscillator being a high accuracy oscillator relative to said first oscillator;

said second oscillator coupled to an external, high accuracy clock source;

a first timer circuit operable to count clock cycles of said high accuracy oscillator and a second timer circuit operable to count clock cycles of said low power oscillator;

a programmable processor coupled to said low power oscillator and said high accuracy oscillator, said programmable processor operable to select said high accuracy oscillator as a processor clock source in a first mode and said low power oscillator as said processor clock source in a second mode, wherein said programmable processor monitors said clock cycles counted by said first and second timer circuits to identify a timing relationship between said high accuracy oscillator and said low power oscillator; and a multiplexer wherein said low power oscillator and said high accuracy oscillator are multiplexed to said programmable processor, wherein said programmable processor is operable to disable said high accuracy oscillator during a predetermined condition, and wherein said programmable processor uses said timing relationship to adjust for timing differences between said low power oscillator and said high accuracy oscillator when said high accuracy oscillator is disabled and said low power oscillator is operable as said processor clock source, and wherein said second timer circuit provides a stopclear signal via a logic circuit to said multiplexer to enable said processor clock source at predetermined intervals.

13. The integrated circuit of claim 12 further comprising an external event monitor coupled via said logic circuit to said second timer circuit and to said multiplexer, wherein said external event monitor provides a signal to enable said processor clock source for said programmable processor.

14. The integrated circuit of claim 13 wherein said logic circuit comprises a logical OR gate having a first input coupled to said second timer circuit and a second input coupled to said external event monitor, and a controller coupled between an output of said OR gate and said programmable processor.

15. The integrated circuit of claim 14 wherein said controller is a set-reset latch.

16. The integrated circuit of claim 14 wherein said programmable processor provides a stopset signal to said controller to turn off said programmable processor, and wherein said controller provides a stopclock signal to said multiplexer to turn off said high accuracy oscillator as said processor clock source.

17. A method for clocking an integrated circuit comprising the steps of:

coupling a high accuracy oscillator to an external, first clock source;

selecting between said first oscillator and a second oscillator as a processor clock source via a programmable processor said first oscillator being a low power oscillator relative to said second oscillator and said second oscillator being a high accuracy oscillator relative to said first oscillator;

counting clock cycles of said high accuracy oscillator with a first timer circuit and clock cycles of said low power oscillator with a second timer circuit; and monitoring said first and second timer circuits while said high accuracy oscillator is enabled to identify a timing relationship between said high accuracy oscillator and said low power oscillator.

18. The method of claim 17 further comprising the steps of:

disabling said high accuracy oscillator in predetermined conditions via said programmable processor; and using said timing relationship to adjust for timing differences between said low power oscillator and said high accuracy oscillator when said high accuracy oscillator is disabled and said low power oscillator is operable as said processor clock source.

19. The method of claim 17 wherein said coupling step comprises coupling said high accuracy oscillator to a crystal-based clock.

20. The method of claim 17 further comprising the step of providing a stopclear signal from said second timer circuit to said multiplexer via a logic circuit to enable said processor clock source for said programmable processor at predetermined intervals.

21. The method of claim 20 further comprising the step of enabling said processor clock source for said programmable processor via an external event monitor coupled via said logic circuit to said multiplexer.

22. The method of claim 21 further comprising the steps of:

providing a stopset signal to a controller in said logic circuit via said programmable processor to turn off said programmable processor; and providing a stopclock signal to said multiplexer via said controller to turn off said processor clock source.

\* \* \* \* \*